(12) United States Patent
Kikuzuki et al.

(10) Patent No.: US 9,398,600 B2
(45) Date of Patent: Jul. 19, 2016

(54) BASE STATION DEVICE, RADIO COMMUNICATION SYSTEM, AND BASE STATION DEVICE CONTROL METHOD

(71) Applicant: FUJITSU LIMITED, Kawasaki-shi, Kanagawa (JP)

(72) Inventors: Tatsuya Kikuzuki, Kawasaki (JP); Kaoru Yokoo, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 13/939,990

(22) Filed: Jul. 11, 2013

(65) Prior Publication Data

US 2013/0294422 A1 Nov. 7, 2013

Related U.S. Application Data

(63) Continuation of application No. PCT/JP2011/050375, filed on Jan. 12, 2011.

(51) Int. Cl.
*H04W 72/12* (2009.01)

(52) U.S. Cl.
CPC ...... *H04W 72/1205* (2013.01); *H04W 72/1221* (2013.01); *H04W 72/1278* (2013.01)

(58) Field of Classification Search
None
See application file for complete search history.

(56) References Cited

U.S. PATENT DOCUMENTS

| 2001/0055314 | A1 | 12/2001 | Suzuki et al. | |
| 2007/0297360 | A1 | 12/2007 | Joachim et al. | |
| 2009/0201865 | A1* | 8/2009 | Uemura et al. | 370/329 |
| 2009/0247178 | A1* | 10/2009 | Lunden et al. | 455/452.1 |
| 2009/0305716 | A1* | 12/2009 | Ono | 455/452.2 |

FOREIGN PATENT DOCUMENTS

| JP | 2000-341192 | 12/2000 |
| JP | 2001-77836 | 3/2001 |
| JP | 2002-9780 | 1/2002 |
| JP | 2008-22561 | 1/2008 |
| WO | 2007/139188 | 12/2007 |

OTHER PUBLICATIONS

International search report issued for corresponding International Patent Application No. PCT/JP2011/050375, mailed Feb. 8, 2011, with English translation.
LG Electronics Inc.; "Discussion on Persistent Scheduling"; Agenda Item: 5.1.1.4; 3GPP TSG-RAN WG2 #60; R2-074982; Jeju, Korea; Nov. 5-9, 2007.

(Continued)

*Primary Examiner* — Huy D Vu
*Assistant Examiner* — Hong Shao
(74) *Attorney, Agent, or Firm* — Myers Wolin, LLC

(57) ABSTRACT

A calculation unit computes, based on subsequent information that is added to data transmitted from a terminal device and indicates the presence or absence of untransmitted data reserved in the terminal device when transmitting the data, the number of data in which untransmitted data exists among the certain number of data previously transmitted from the terminal device. A time slot assignment control unit controls the assigned size of a time slot to the terminal device based on the number of the data, in which untransmitted data exists, computed by the calculation unit. A data processing unit notifies the terminal device of the assigned size of the time slot determined by the time slot assignment control unit.

4 Claims, 10 Drawing Sheets

(56) References Cited

OTHER PUBLICATIONS

LG Electronics Inc.; "BSR for Persistent Scheduling"; Agenda Item: 5.1.1.5; 3GPP TSG-RAN WG2 #61; R2-081070; Sorrento, Italy; Feb. 11-15, 2008.

ASUSTeK; "Identification of the demand for more UL resource"; Agenda Item: 5.1 1 8; 3GPP TSG RAN WG2 #61; R2-080887; Sorrento, Italy; Feb. 11-15, 2008.

* cited by examiner

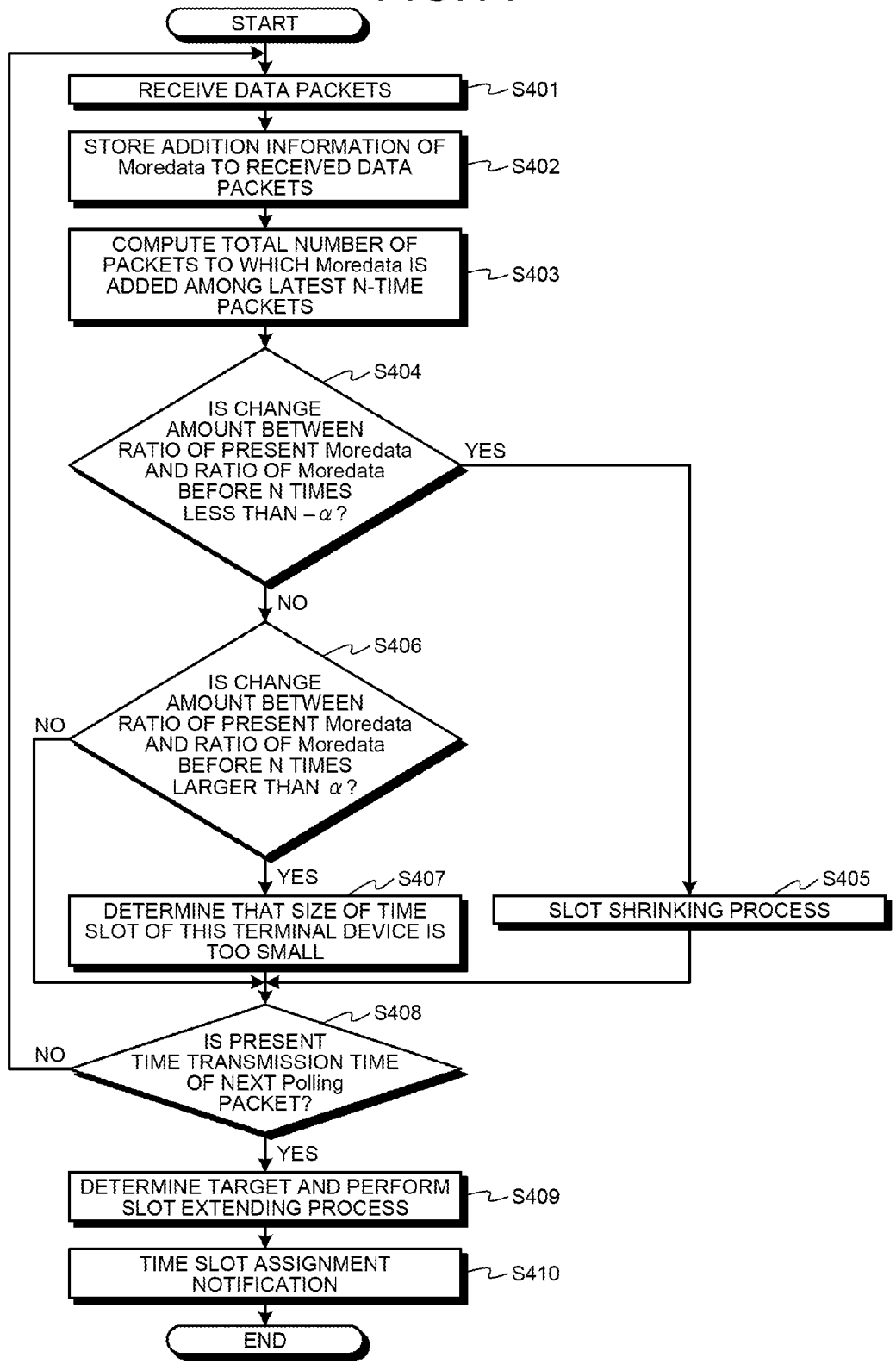

BASE STATION DEVICE, RADIO COMMUNICATION SYSTEM, AND BASE STATION DEVICE CONTROL METHOD

CROSS-REFERENCE TO RELATED APPLICATIONS

This application is a continuation of International Application No. PCT/JP2011/050375, filed on Jan. 12, 2011, the entire contents of which are incorporated herein by reference.

FIELD

The embodiments discussed herein are directed to a base station device, a radio communication system, and a base station device control method.

BACKGROUND

In a radio communication system, there is known a conventional time slot assignment method in which a base station assigns a time slot to each terminal station by using a non-competitive term of a radio link or the like.

The time slot assignment method includes a conventional technology in which a terminal station transmits a time slot assignment request packet and then a base station transmits a time slot assignment notification packet. In this conventional technology, the terminal station transmits the time slot assignment request packet to the base station. Then, the terminal station receives the time slot assignment notification packet from the base station as a response to the time slot assignment request packet. This leads to expanding a time slot assigned to the terminal station that requests time slot assignment.

Patent Literature 1: Japanese Laid-open Patent Publication No. 2000-341192

As described above, in the conventional technology of using the time slot assignment request packet, the terminal station transmits the time slot assignment request packet and then the base station transmits the assignment notification packet, thereby assigning a time slot to the terminal station. In other words, in the conventional technology, because exchange of a packet having no direct connection with transmit data must be performed at least two times when the terminal station transmits data, data delay and power consumption increase.

SUMMARY

According to an aspect of an embodiment, a base station device includes: a calculation unit that computes, based on subsequent information that is added to data from a terminal device and indicates presence or absence of untransmitted data reserved in the terminal device when transmitting the data, a number of data in which the untransmitted data exists among a certain number of data previously transmitted from the terminal device; a time slot assignment control unit that controls an assigned size of a time slot to the terminal device based on the number of data, in which the untransmitted data exists, computed by the calculation unit; and a notifying unit that notifies the terminal device of the assigned size of the time slot determined by the time slot assignment control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a flowchart illustrating a time slot assignment process performed by a radio communication system according to a fifth embodiment.

DESCRIPTION OF EMBODIMENTS

Preferred embodiments of the present invention will be explained with reference to accompanying drawings. The base station device, the terminal device, the radio communication system, and the base station device control method are not limited by the embodiments explained below.

[a] First Embodiment

Figure 1:
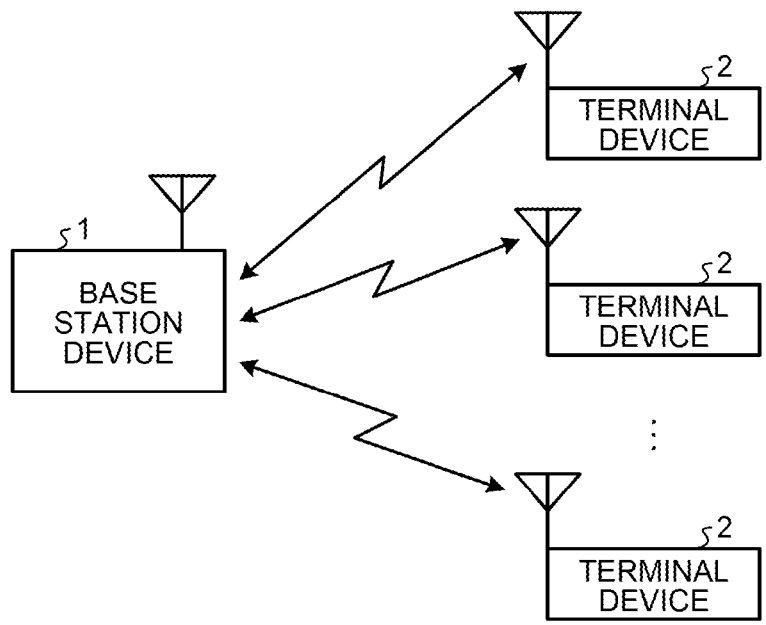
FIG. 1 is a diagram illustrating the entire configuration of a radio communication system.

FIG. 1 is a diagram illustrating the entire configuration of a radio communication system. First, a flow of an overall process of the radio communication system according to the present embodiment will be explained with reference to FIG. 1.

As illustrated in FIG. 1, a base station device 1 is connected to a plurality of terminal devices 2 through radio communication. Herein, the base station device 1 and the terminal devices 2 perform transmission and reception of data by using radio communication.

First, the base station device 1 notifies the terminal device 2 of time slot assignment information. Then, the terminal device 2 transmits data packets to the base station device 1 within an assigned time slot. For example, a time slot in which three data packets can be transmitted is assigned to the terminal device 2. In that case, the terminal device 2 can transmit three data packets to the base station device 1 within the assigned time slot. Then, when transmission data consists of four or more data packets, the terminal device 2 adds Moredata, which is information indicating that the subsequent data exists, to the latest data packet of three data packets to be transmitted within one time slot, and transmits the three data packets to the base station device. More specifically, the addition of "Moredata" means that the value of a Moredata bit is set to "1". Herein, Moredata means data that is requested to be transmitted within a specified time as soon as possible. For example, although there is transmission data that is not yet transmitted, when the transmission data may be transmitted after one hour, Moredata is not added to data transmitted before the transmission data. Data that is requested to be transmitted within a specified time as soon as possible but that is not yet transmitted corresponds to an example of "untransmitted data". "Moredata" corresponds to an example of subsequent information. Hereinafter, the latest data packet within one time slot, in other words, the finally transmitted data packet is referred to as a "subsequent state notification packet".

Figure 2:
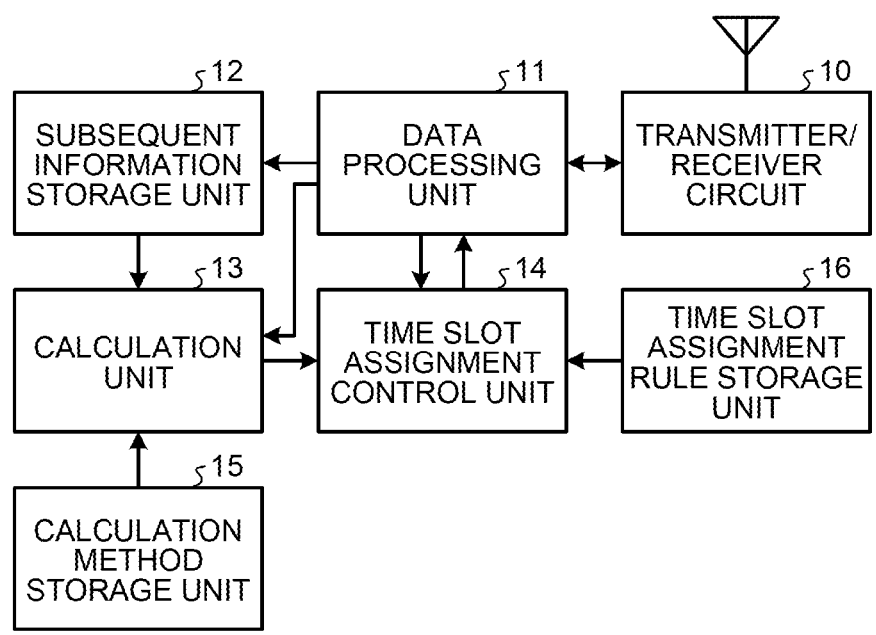
FIG. 2 is a block diagram of a base station device according to a first embodiment.

FIG. 2 is a block diagram of the base station device according to the first embodiment. Next, the configuration of the base station device according to the present embodiment will be explained with reference to FIG. 2. As illustrated in FIG. 2, the base station device 1 includes a transmitter/receiver circuit 10, a data processing unit 11, a subsequent information storage unit 12, a calculation unit 13, a time slot assignment control unit 14, a calculation method storage unit 15, and a time slot assignment rule storage unit 16.

Next, the configuration of the base station device 1 will be explained. The transmitter/receiver circuit 10 receives data packets to be transmitted from the data processing unit 11 to the terminal device 2. Then, the transmitter/receiver circuit 10 transmits the data packets to the terminal device 2 via an antenna. Moreover, the transmitter/receiver circuit 10 receives data packets from the terminal device 2 via the antenna. Then, the transmitter/receiver circuit 10 outputs the received data packets to the data processing unit 11.

The data processing unit 11 receives the data packets transmitted from the terminal device 2 from the transmitter/receiver circuit 10. Then, the data processing unit 11 determines whether Moredata is added to a subsequent state notification packet of the received data packets. Then, the data processing unit 11 causes the subsequent information storage unit 12 to store therein information indicative of whether Moredata is added to and identification information and reception time of the terminal device 2 that transmits the data packet. Furthermore, the data processing unit 11 outputs, to the calculation unit 13, notification that the subsequent state notification packet is received and the identification information of the terminal device 2 that transmits the data packet.

The data processing unit 11 receives time slot assignment information to the terminal device 2 from the time slot assignment control unit 14. Then, the data processing unit 11 generates a Polling packet by using the received assignment information. Then, the data processing unit 11 transmits the generated Polling packet to the corresponding terminal device 2 via the transmitter/receiver circuit 10 and the antenna. The terminal device 2 acquires assignment information for a new time slot by receiving the Polling packet. However, when the already extended time slot is assigned to the other terminal device 2, the new time slot cannot be assigned to the terminal device 2 designated to the time slot assignment control unit 14. Therefore, the data processing unit 11 notifies the time slot assignment control unit 14 of a time at which the next Polling packet can be transmitted. As a result, the data processing unit 11 acquires time slot assignment information from the time slot assignment control unit 14 at the time at which the next Polling packet is transmitted.

In the present embodiment, it has been explained that assignment notification for a time slot is performed by using a Polling packet. However, another packet may be used for assignment notification. For example, a time slot assignment notification packet or the like may be used.

When the Polling packet is used, the terminal device 2 receives a packet for temporarily extending or shrinking a time slot. As a result, the base station device 1 receives the Polling packet and then can assign the expanded time slot or the shrunk time slot to the terminal device 2 only for a certain fixed time.

In the method for using the time slot assignment notification packet, the base station device 1 periodically transmits, to the terminal device 2, a notification packet indicating that the contents of a time slot to be assigned are changed. As a result, the base station device 1 can change the number of time slots for the terminal device 2 and the number of data packets that can be transmitted in one time slot. In this case, the data processing unit 11 notifies the terminal device 2 of assignment information at a time at which the periodic time slot assignment notification packet is transmitted.

The subsequent information storage unit 12 is a storage device such as a memory and a hard disk. The subsequent information storage unit 12 stores the information indicating whether Moredata received from the data processing unit 11 is added to and the identification information and reception time of the terminal device 2 that transmits the data packet, in association with one another.

The calculation method storage unit 15 is a storage device such as a memory and a hard disk. The calculation method storage unit 15 stores a calculation method for performing statistical processing on the information stored in the subsequent information storage unit 12 and for obtaining data used for determining the assignment of a time slot. In the present embodiment, the calculation method storage unit 15 stores a calculation method for calculating the number of data packets, to which Moredata is added, among the received latest N-time data packets.

The calculation unit 13 receives, from the data processing unit 11, notification that a data packet is received and identification information of the terminal device 2 that transmits the data packet. Then, the calculation unit 13 calculates data used for determining the assignment of the time slot by using the calculation method stored in the calculation method storage unit 15. In the present embodiment, the calculation unit 13 first acquires, from the subsequent information storage unit 12, addition information of Moredata in the latest N-time data packets transmitted by the terminal device 2 designated to the data processing unit 11. Then, the calculation unit 13 calculates the number of data packets, to which Moredata is added, among the latest N-time data packets transmitted by the terminal device 2 designated to the data processing unit 11. The latest N times corresponds to an example of "the certain number of data". Moreover, the number of data packets to which Moredata is added corresponds to an example of "the number of data in which the untransmitted data exists among the certain number of data previously transmitted from the terminal device". Then, the calculation unit 13 outputs the calculated number of data packets, to which Moredata is added, to the time slot assignment control unit 14.

The time slot assignment rule storage unit 16 is a storage device such as a memory and a hard disk. The time slot assignment rule storage unit 16 stores a time slot assignment rule for determining the assignment of a time slot by using the data used for determining the assignment of the time slot calculated by the calculation unit 13.

In the present embodiment, the time slot assignment rule storage unit 16 stores therein the following time slot assignment rule. First, when the number of data packets, to which Moredata is added, among the latest N-time data packets transmitted by the terminal device 2 is smaller than M1 that is a certain threshold, a time slot smaller than the present time slot is assigned to the terminal device 2. When the number of data packets, to which Moredata is added, among the latest N-time data packets transmitted by the terminal device 2 is not less than M1 and is not more than a certain threshold M2 (M1<M2), the present time slot of the terminal device 2 is not changed. Furthermore, when the number of data packets, to which Moredata is added, among the latest N-time data packets transmitted by the terminal device 2 is larger than M2, a time slot larger than the present time slot is assigned to the terminal device 2. Herein, the size of a time slot to be assigned is also defined in the time slot assignment rule. For example, a time slot larger than the present time slot means a time slot obtained by multiplying two by the present time slot.

Herein, shrinkage prohibition can be realized by setting the value of M1 to a negative value. Moreover, when the number of data packets, to which Moredata is added, among the latest N-time data packets transmitted by the terminal device 2 is smaller than M1 that is the certain threshold, shrinkage prohibition can be realized even if the rule for assigning a time slot smaller than the present time slot to the terminal device 2 is deleted. Extension prohibition can be further realized by setting the value of M2 to a value higher than N. Moreover, when the number of data packets, to which Moredata is added, among the latest N-time data packets transmitted by the terminal device 2 is larger than M2, extension prohibition can be realized even if the rule for assigning a time slot larger than the present time slot to the terminal device 2 is deleted.

In the present embodiment, various parameters for determining the assignment of a time slot, which are stored in the time slot assignment rule storage unit 16 and are included in the time slot assignment rule, are fixed to certain values. In other words, in the present embodiment, N, M1, and M2 are fixed values. As described above, the method for fixedly using the certain parameters is particularly effective when data generation status from the terminal device 2 is not almost changed or transmission and reception environment of data between the base station device 1 and the terminal device 2 is not almost changed.

The time slot assignment control unit 14 receives a time, at which the Polling packet can be then transmitted, from the data processing unit 11. After that, the time slot assignment control unit 14 stores the time at which the Polling packet can be then transmitted.

The time slot assignment control unit 14 receives the data used for determining the assignment of a time slot from the calculation unit 13. In the present embodiment, the time slot assignment control unit 14 receives, from the calculation unit 13, the number of data packets, to which Moredata is added, among the latest N-time data packets transmitted by the terminal device 2 that transmits the present data packet. Then, the time slot assignment control unit 14 determines to assign the time slot to the terminal device 2 that transmits the present data packet in accordance with the time slot assignment rule stored in the time slot assignment rule storage unit 16. Then, the time slot assignment control unit 14 outputs the determined time slot assignment information to the data processing unit 11.

Herein, a time slot assignment process performed by the time slot assignment control unit 14 will be explained in detail. First, it will be explained that the number of the terminal devices 2, which transmit the subsequent state notification packet to which Moredata is added, is one until the next Polling packet can be transmitted.

Among the latest N-time subsequent state notification packets transmitted from the terminal device 2 that transmits the subsequent state notification packet to which Moredata is added, it will be explained that the number of the packets to which Moredata is added is "P". The time slot assignment control unit 14 determines which of P<M1, M1≤P≤M2, and M2<P is satisfied. In case of P<M1, the time slot assignment control unit 14 determines that the size of the time slot is too large. Then, the time slot assignment control unit 14 performs a slot shrinking process on the time slot assigned to the terminal device 2 that transmits the subsequent state notification packet to which Moredata is added. Herein, the slot shrinking process means a process for destroying the present time slot and assigning a time slot in which data packets fewer than those of the present time slot can be transmitted. After that, the time slot assignment control unit 14 transmits assignment information for the time slot, on which the shrinking process is performed, to the data processing unit 11. Moreover, in case of M1≤P≤M2, the time slot assignment control unit 14 does not perform the change of time slot assignment and the transmission of assignment information to the data processing unit 11. Moreover, in case of M2<P, the time slot assignment control unit 14 determines that the size of the time slot is too small. Then, the time slot assignment control unit 14 performs a slot extending process on the time slot assigned to the terminal device 2 that transmits the subsequent state notification packet to which Moredata is added. Herein, the slot extending process means a process for destroying the present time slot and assigning a time slot in which data packets more than those of the present time slot can be transmitted. Then, the time slot assignment control unit 14 transmits assignment information for the time slot, on which the extending process is performed, to the data processing unit 11.

Next, it will be explained that the number of the terminal devices 2 that transmit the subsequent state notification packet to which Moredata is added is two or more until the next Polling packet can be transmitted.

The time slot assignment control unit 14 performs determination of the time slot size on each of the terminal devices 2, which transmit the subsequent state notification packet to which Moredata is added, up to the time at which the Polling packet is then transmitted.

Then, when the number of the terminal devices 2, for which it is determined that the size of the time slot is too small, is two or more, the time slot assignment control unit 14 extracts the terminal device 2, for which the number of the subsequent state notification packets to which Moredata is added is most, among the terminal devices. Then, the time slot assignment control unit 14 performs the slot extending process on the extracted terminal device 2. On the contrary, the time slot assignment control unit 14 does not perform the change of assignment on the time slots of the terminal devices 2 other than the extracted terminal device 2. Moreover, the time slot assignment control unit 14 performs the slot shrinking process on the terminal device 2 for which it is determined that the size of the time slot is too large. Then, the time slot assignment control unit 14 transmits, to the data processing unit 11, time slot assignment information of each of the terminal devices 2 on which the slot shrinking process and the slot extending process are performed.

It is possible to avoid a state where whether the slot extending process is performed on any of the terminal devices 2 is not determined by performing the slot extending process on the terminal device 2 for which the number of the subsequent state notification packets to which Moredata is added is most.

Figure 3:
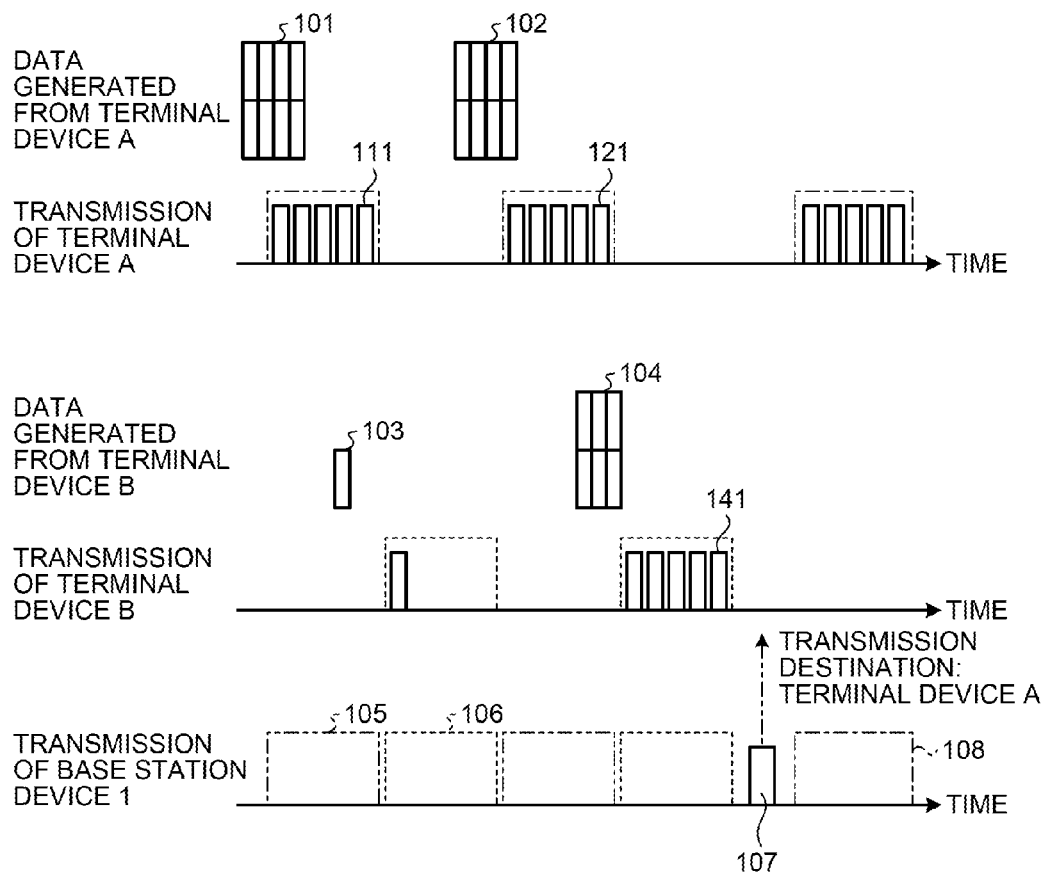
FIG. 3 is a diagram explaining the selection of a terminal device when the number of terminal devices for which it is determined that the size of a time slot is too small is two or more.

The procedure of selection of the terminal device 2 that performs the slot extending process will be explained with reference to FIG. 3 when the number of the terminal devices 2 for which it is determined that the size of the time slot is too small is two or more. FIG. 3 is a diagram explaining the selection of a terminal device when the number of terminal devices for which it is determined that the size of the time slot is too small is two or more.

Hereinafter, it will be explained that the base station device 1 receives data from terminal devices A and B. The terminal devices A and B are any of the terminal devices 2 illustrated in FIG. 1. Herein, the upmost stage on the page space of FIG. 3 indicates data generated from the terminal device A. The second stage from the top on the page space of FIG. 3 indicates data packets transmitted from the terminal device A. The third stage from the top on the page space of FIG. 3 indicates data generated from the terminal device B. The fourth stage from the top on the page space of FIG. 3 indicates data packets transmitted from the terminal device B. Furthermore, the downmost stage on the page space of FIG. 3 indicates data transmitted from the base station device 1. However, a part surrounded with a two-dot chain line in the downmost stage on the page space of FIG. 3 indicates a time slot assigned to the terminal device A and a part surrounded with a dotted line indicates a time slot assigned to the terminal device B. Moreover, each stage of FIG. 3 indicates that a time passes toward the right on the page space.

In the following descriptions, the case of N=6, M1=2, and M2=4 will be explained. Before data 101, four subsequent state notification packets to which Moredata is added are already and continuously transmitted from the terminal device A to the base station device 1. Moreover, before data 103, four subsequent state notification packets to which Moredata is added are already and continuously transmitted from the terminal device B to the base station device 1. Then, at the step before transmitting the data 101, a time slot 105 in which five data packets can be transmitted is given to the terminal device A. Moreover, at the step before transmitting the data 103, a time slot 106 in which five data packets can be transmitted is given to the terminal device B.

The data 101 that includes eight data packets is generated from the terminal device A. Then, the terminal device A transmits five data packets of the data 101 to the base station device 1 within the time slot 105 assigned at that point. At this time, because the transmission of the data 101 is not terminated, Moredata is added to a subsequent state notification packet 111 of the transmitted data packets.

Because the next time slot is the time slot 106 assigned to the terminal device B, the terminal device B transmits the data 103, which includes one data packet generated before that, within the time slot 106. At this time, because the data 103 can be totally transmitted, Moredata is not added to a subsequent state notification packet of the transmitted data packets.

Because the next time slot is the time slot 105 assigned to the terminal device A, the terminal device A transmits remaining three packets of the data 101 and two data packets of data 102 within the time slot 105. At this time, because the transmission of the data 102 is not terminated, Moredata is added to a subsequent state notification packet 121 of the transmitted data packets.

Furthermore, because the next time slot is the time slot 106 assigned to the terminal device B, the terminal device B transmits five data packets of data 104 having six data packets within the time slot 106. At this time, because the transmission of the data 104 is not terminated, Moredata is added to a subsequent state notification packet 141 of the transmitted data packets.

In this case, because Moredata is added to all packets of the past six subsequent state notification packets of the terminal device A, the base station device 1 determines that the size of the time slot for the terminal device A is too small. Moreover, because Moredata is added to five data packets of the past six subsequent state notification packets of the terminal device B, the base station device 1 determines that the size of the time slot for the terminal device B is too small. Then, the base station device 1 compares a ratio of subsequent state notification packets to which Moredata is added in the terminal device A with a ratio of subsequent state notification packets to which Moredata is added in the terminal device B. Then, the base station device 1 determines that the ratio of subsequent state notification packets to which Moredata is added in the terminal device A is high compared with the terminal device B, and performs the slot extending process on the terminal device A. Along with this, the base station device 1 transmits a Polling packet 107 to the terminal device A. At this time, the base station device 1 assigns a time slot 108, in which data packets more than those of the time slot 105 can be transmitted, to the terminal device A.

In this regard, whether a time slot is given to a receiving station by using only receipt information of Moredata may be determined as the time slot assignment method. For example, when a subsequent state notification packet that is transmitted within a time slot assigned to a specified terminal device is a data packet to which Moredata is added, this method is a method in which the base station device transmits a Polling packet to the terminal device. However, in this method, it is concerned that a problem occurs when two or more terminal stations exist. For example, it is assumed that the base station device previously prepares a time slot to be assigned to a terminal device that adds Moredata to a subsequent state notification packet and transmits the subsequent state notification packet. In this state, a certain terminal device adds Moredata to a subsequent state notification packet and transmits the subsequent state notification packet to the base station within a time slot presently assigned to the terminal device. At the same time, another terminal device adds Moredata to a subsequent state notification packet and transmits the subsequent state notification packet to the base station within a time slot presently assigned to the other terminal device. In this case, the base station device cannot decide to which of the terminal devices a Polling packet for giving the previously prepared time slot is transmitted. In fact, transmitting a Polling packet to a terminal station having many stagnating data can reduce the delay of data. However, it is difficult that the base station determines the state in a conventional method.

On the contrary, there is a high possibility that the terminal device 2, for which the proportion of subsequent state notification packets to which Moredata is added is high, is a terminal device with many stagnating packets. Therefore, by selecting the terminal device 2 as in the radio communication system according to the present embodiment, it is possible to increase a probability that a large time slot can be assigned to the terminal device with much stagnating data, and thus the assignment of more appropriate time slots can be performed.

Moreover, by assigning many time slots to the terminal device 2 for which the proportion (hereinafter, "Moredata ratio") of subsequent state notification packets to which Moredata is added is high, the Moredata ratio from the terminal device 2 is decreased. On the contrary, the Moredata ratio of the terminal device 2 having a small Moredata ratio is gradually increased. As a result, the Moredata ratio is reversed. By doing so, when again assigning many time slots to the terminal device 2 having a large Moredata ratio, it is expected that many time slots are assigned to the terminal device 2 with much stagnating data. As described above, by repeating an algorithm for assigning more time slots to the terminal device 2 having more Moredata every certain fixed time, the assignment of appropriate time slots can be realized. Therefore, it is possible to avoid a danger that the assignment of time slots to the terminal device 2 having fewer Moredata is reduced, stagnating data is increased, and data delay is increased.

Figure 4:
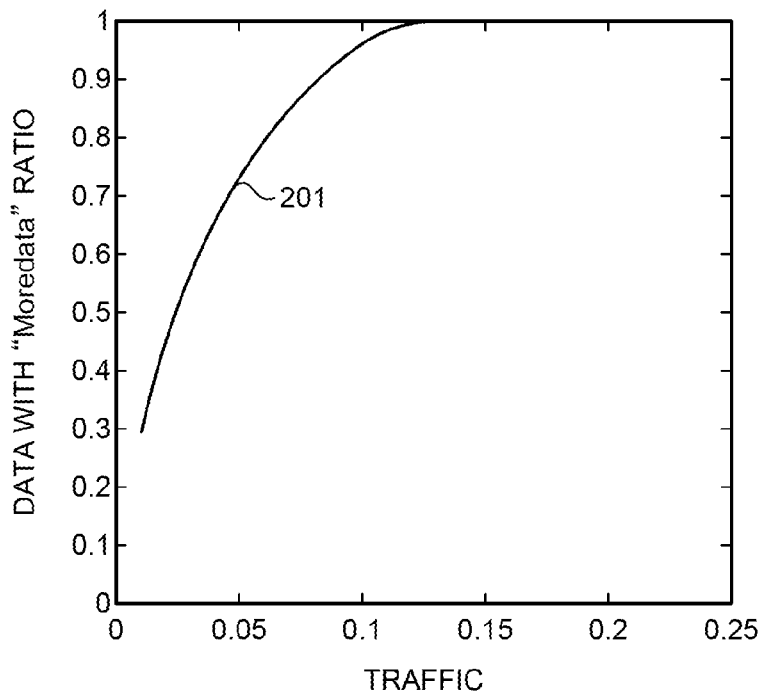
FIG. 4 is a diagram illustrating a relationship between a traffic and a ratio of Moredata to data transmitted by the terminal device.
Figure 5:
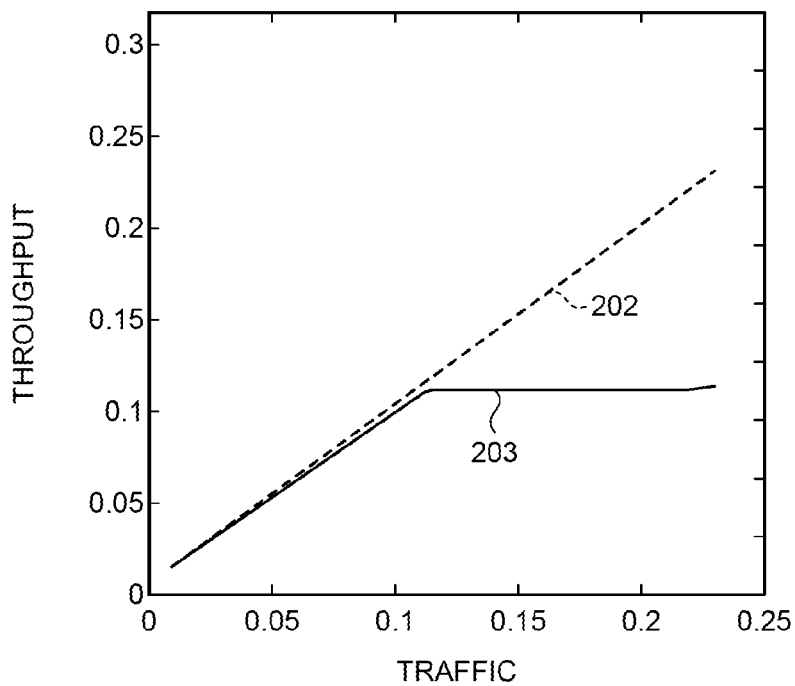
FIG. 5 is a diagram illustrating a relationship between throughput and traffic of the terminal device illustrated in FIG. 4.

Next, the details of a time slot assignment determination method performed by the time slot assignment control unit 14 will be explained with reference to FIGS. 4 and 5 by using a method for using a relationship between a throughput and a ratio of Moredata to data packets as an example. FIG. 4 is a diagram illustrating a relationship between a traffic and a ratio of Moredata to data transmitted by a terminal device. In FIG. 4, the vertical axis indicates a ratio of Moredata to data and the horizontal axis indicates a value of traffic. FIG. 5 is a diagram illustrating a relationship between the throughput and traffic of the terminal device illustrated in FIG. 4. In FIG. 5, the vertical axis indicates a throughput and the horizontal axis indicates a traffic.

Herein, the traffic is a ratio of a length (a transmission time of one data packet) of one packet of data to an average generation time interval per one packet of data. For example, it is assumed that an average generation time interval per one packet of data is one second and a transmission time of one data packet is one second. In this case, the traffic is "1". Alternatively, it is assumed that an average generation time interval per one packet of data is one second and a transmission time of one packet is 0.1 seconds. In this case, the traffic is "0.1". A throughput is a ratio of a length per one packet of data to an average transmission interval per one packet of data. In other words, the throughput indicates a ratio of data packets that can be transmitted. In FIGS. 4 and 5, a designer of the radio communication system may input values that are previously measured, or a device may measure and update values every fixed time.

A dotted line 202 of FIG. 5 indicates that all data are transmitted to the base station. A solid line 203 of FIG. 5 indicates actual measurement data. From FIG. 5, it turns out that the traffic and throughput have the same value even if the traffic becomes 0.1. In other words, the generated data are substantially totally received by the base station device 1 until the traffic reaches 0.1. It turns out that the throughput is smaller than the traffic if the traffic becomes larger than 0.1. Therefore, a value indicating that the traffic is 0.1 corresponds to a threshold at which data that cannot be transmitted is generated.

Herein, it is assumed that a ratio of packets to which Moredata is added to subsequent state notification packets received by the base station device 1 from the specified terminal device 2 is 0.7. In that case, from a solid line 201 of FIG. 4, it can be estimated that the traffic is about 0.05. As described above, a value indicating that the traffic is 0.1 is a threshold at which data that cannot be transmitted is generated. Herein, if a time slot is shrunk to 0.5(=0.05/0.1), optimum assignment can be performed because the minimum size of a time slot in which the base station device 1 can receive all data generated from the terminal device 2 is assigned. Therefore, in this case, it is only necessary that the time slot assignment control unit 14 assigns, to the terminal device 2, a time slot that is obtained by shrinking the time slot assigned to the terminal device 2 to half. As above, shrinkage has been explained. Similarly, the explanation is applied to extension.

Figure 6:
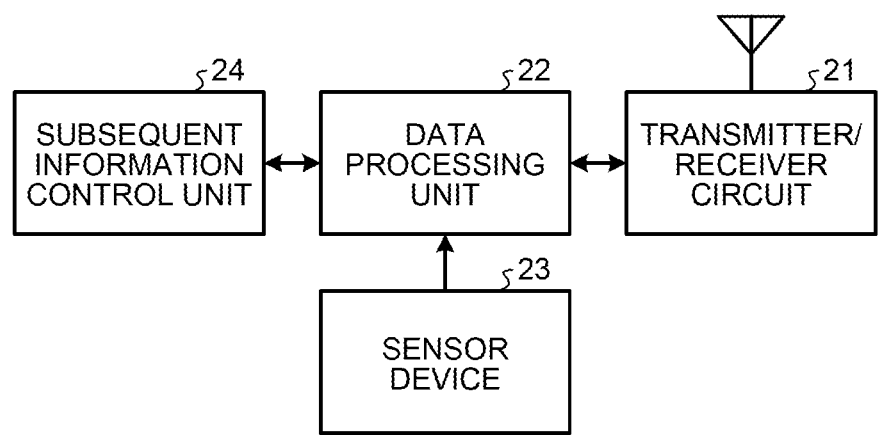
FIG. 6 is a block diagram of the terminal device.

FIG. 6 is a block diagram of the terminal device. Next, the configuration of the terminal device 2 will be explained with reference to FIG. 6.

As illustrated in FIG. 6, the terminal device 2 according to the present embodiment includes a transmitter/receiver circuit 21, a data processing unit 22, a sensor device 23, and a subsequent information control unit 24.

The sensor device 23 generates data to be transmitted. Then, the sensor device 23 supplies the generated data to the data processing unit 22.

The data processing unit 22 stores the data from the sensor device 23. Then, the data processing unit 22 notifies the subsequent information control unit 24 of the increment (one) of data. When there is subsequent data in data to be then transmitted, the data processing unit 22 receives the addition instruction of Moredata to data to be then transmitted, from the subsequent information control unit 24. Upon receiving the addition instruction of data, the data processing unit 22 adds Moredata to a subsequent state notification packet and also generates data packets for transmission. On the other hand, if there is not the instruction from the subsequent information control unit 24, the data processing unit 22 generates data packets for transmission without adding Moredata to the subsequent state notification packet. Then, when reaching a data transmission time, the data processing unit 22 transmits the generated packets toward the base station device 1 via the transmitter/receiver circuit 21 and the antenna. Then, when it is determined that the data packets are normally transmitted, the data processing unit 22 notifies the subsequent information control unit 24 of information indicating that one data is decreased. Moreover, the data processing unit 22 receives a Polling packet via the transmitter/receiver circuit 21. Then, the data processing unit 22 notifies the subsequent information control unit 24 of a time slot notified by the Polling packet.

The subsequent information control unit 24 receives the time slot notified by the Polling packet from the data processing unit 22. As a result, the subsequent information control unit 24 obtains a criterion that indicates whether Moredata is added.

Upon receiving notification indicating that one data is increased from the data processing unit 22, the subsequent information control unit 24 determines whether Moredata is added to data to be then transmitted on the basis of an amount of data stored in the data processing unit 22. Then, when it is determined that Moredata is added, the subsequent information control unit 24 notifies the data processing unit 22 of the addition instruction of Moredata.

Upon receiving notification that one data is decreased from the data processing unit 22, the subsequent information control unit 24 determines whether Moredata is added to data to be then transmitted on the basis of the amount of data stored in the data processing unit 22. Then, when it is determined that Moredata is added, the subsequent information control unit 24 notifies the data processing unit 22 of the addition instruction of Moredata.

Figure 7:
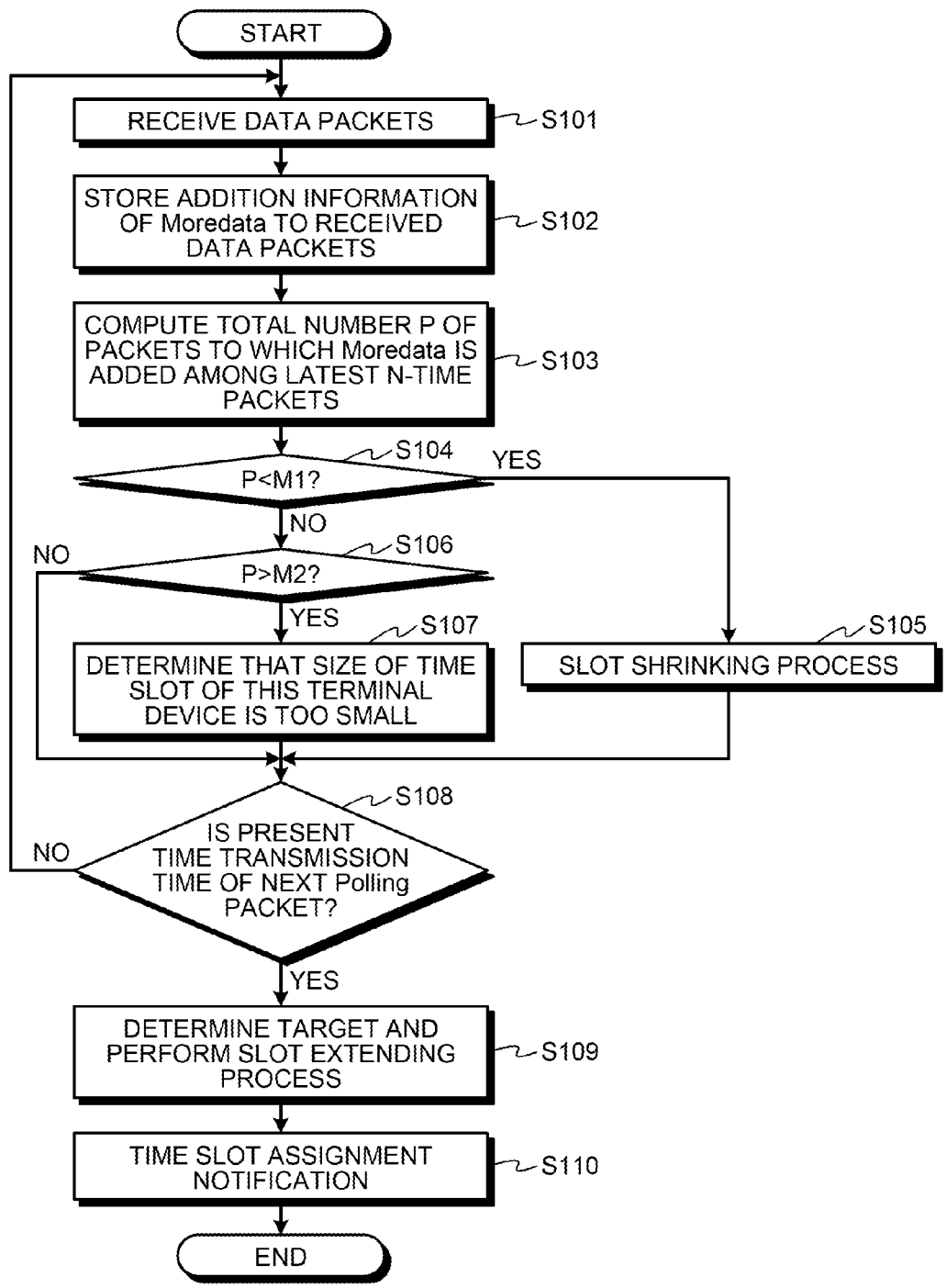
FIG. 7 is a flowchart illustrating a time slot assignment process performed by the radio communication system according to the first embodiment.

Next, a time slot assignment process performed by the radio communication system according to the present embodiment will be explained with reference to FIG. 7. FIG. 7 is a flowchart of a time slot assignment process performed by the radio communication system according to the first embodiment.

The data processing unit 11 receives data packets from the terminal device 2 via the antenna and the transmitter/receiver circuit 10 (Step S101).

The data processing unit 11 determines whether Moredata is added to the received subsequent state notification packet, and makes the subsequent information storage unit 12 store the determination result and the identification information and reception time of the terminal device 2 that transmits the data packets (Step S102). Then, the data processing unit 11 notifies the calculation unit 13 of the reception of data packets and the identification information of the terminal device 2 that transmits the data packets.

The calculation unit 13 receives reception information of the subsequent state notification packet, and then computes the total number P of packets to which Moredata is added, among the latest N-time packets transmitted by the terminal device 2 that transmits the data packets (Step S103). The calculation unit 13 transmits, to the time slot assignment control unit 14, the total number P of packets to which Moredata is added among the latest N-time packets transmitted by the terminal device 2 that transmits the data packets.

The time slot assignment control unit 14 determines whether P is smaller than the certain threshold M1 (Step S104). In case of P<M1 (Step S104: YES), the time slot assignment control unit 14 performs the slot shrinking process on a slot assigned to the terminal device 2 that transmits the data packets (Step S105). Then, the process moves to Step S108.

On the contrary, in case of P1≥M1 (Step S104: NO), the time slot assignment control unit 14 determines whether P is larger than the certain threshold M2 (Step S106). In case of P>M2 (Step S106: YES), the time slot assignment control unit 14 determines that the size of the time slot of the terminal device 2 that transmits the data packets is too small (Step S107).

On the contrary, in case of P1≤M2 (Step S106: NO), the time slot assignment control unit 14 does not change the assignment of the time slot of the terminal device 2 that transmits the data packets. The process moves to Step S108.

The time slot assignment control unit 14 determines whether the present time is the transmission time of the next Polling packet (Step S108). When the present time is not the transmission timing of the next Polling packet (Step S108: NO), the process returns to Step S101.

On the contrary, when the present time is the transmission timing of the next Polling packet (Step S108: YES), the time slot assignment control unit 14 extracts the terminal device 2 having the largest Moredata ratio among the terminal devices 2 for which it is determined that the size of the time slot is too small. Then, the time slot assignment control unit 14 determines the extracted terminal device 2 as a target for the slot extending process and performs the slot extending process on the extracted terminal device 2 (Step S109).

Then, the data processing unit 11 notifies the extracted terminal device 2 of time slot information assigned by the time slot assignment control unit 14 to the terminal device 2 that transmits the data packets (Step S110).

Figure 8:
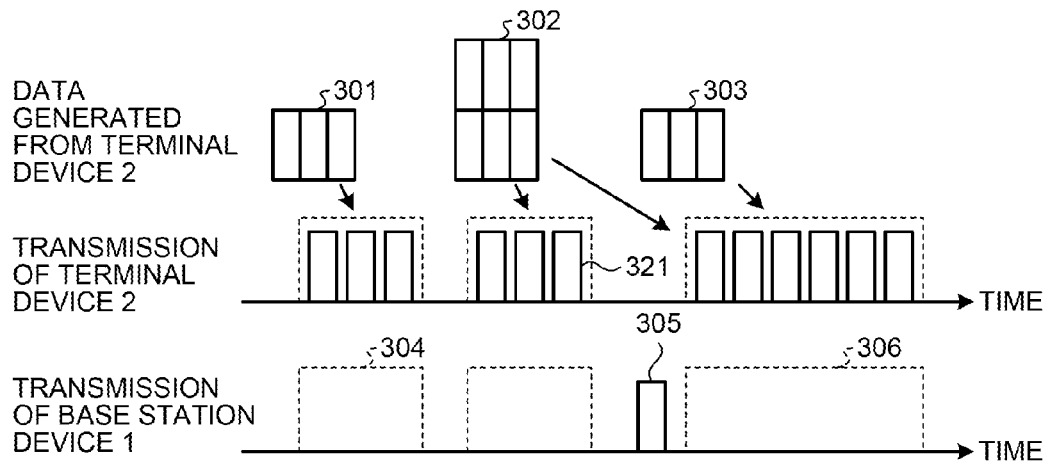
FIG. 8 is a time-sequence diagram illustrating an example of transmission and reception packets in the radio communication system according to the first embodiment.

Next, a flow when the slot extending process is performed will be explained with reference to FIG. 8. FIG. 8 is a time-sequence diagram illustrating an example of transmission and reception packets in the radio communication system according to the first embodiment. Herein, the upmost stage on the page space of FIG. 8 indicates data generated from the specified terminal device 2. Herein, the specified terminal device 2 is simply referred to as the terminal device 2. The middle stage on the page space of FIG. 8 indicates data packets transmitted from the terminal device 2. Furthermore, the downmost stage on the page space of FIG. 8 indicates data transmitted from the base station device 1. A part surrounded with a dotted line on the downmost stage on the page space of FIG. 8 simply indicates time slots assigned to the terminal device 2. Moreover, each stage of FIG. 8 indicates that a time passes toward the right on the page space. In the following descriptions, the cases of N=6, M1=2, and M2=4 will be explained. Moreover, it is explained that, before data 301, four subsequent state notification packets to which Moredata is added are already and continuously transmitted from the terminal device 2 to the base station device 1.

The terminal device 2 transmits the data 301 generated therefrom to the base station device 1 within a time slot 304 assigned at that point. The time slot 304 is a time slot in which three data packets can be transmitted. At this time, because the data 301 includes three data packets, the data 301 can be totally transmitted within the time slot 304 and thus Moredata is not added to the transmitted data packets. Next, the terminal device 2 transmits data 321, which can be transmitted within the time slot 304 among data 302 generated therefrom, to the base station device 1. At this time, because the data 302 includes six data packets, the data 302 cannot be totally transmitted within the time slot 304. Therefore, Moredata is added to the data 321 of the transmitted data packets. Thus, the data 321 is a subsequent state notification packet. In this case, the base station device 1 determines that there are five packets to which Moredata is added among the latest six-time subsequent state notification packets received from the terminal device 2. Because this is larger than M2, the base station device 1 performs the slot extending process on the time slot assigned to the terminal device 2. At this time, the time slot for the terminal device 2 is extended to a time slot 306 in which six data packets can be transmitted. Then, the base station device 1 transmits a Polling packet 305, which includes assignment information on the expanded time slot, to the terminal device 2. The terminal device 2 receives the Polling packet 305 and recognizes that the time slot 306 is assigned to itself. Then, the terminal device 2 transmits the remaining data of the data 302 and data 303 generated next to the base station device 1 within the time slot 306. As a result, data generated from the terminal device 2 are totally received by the base station device 1.

As described above, the radio communication system according to the present embodiment has the configuration that a large time slot is assigned to the terminal device that has a high frequency of appearance of subsequent data information. As a result, because a time slot assignment request is not transmitted, an amount of data for transmission and reception can be reduced and thus data delay and power consumption can be suppressed.

It may be said that a terminal device that has a high frequency of appearance of subsequent data information always requires a large time slot and conversely a terminal device that has a low frequency of appearance of subsequent data information does not require a large time slot that much. Therefore, the assignment of an appropriate time slot can be performed by assigning a large slot to the terminal device that has a high frequency of appearance of subsequent data information.

In the above explanation, a time slot that is prepared for extension is assigned to one terminal device. However, this embodiment is not limited to this. For example, when it is determined that the size of a time slot is too small for each of terminal devices, time slots may be assigned to the terminal devices in accordance with ratios of Moredata.

[b] Second Embodiment

Figure 9:
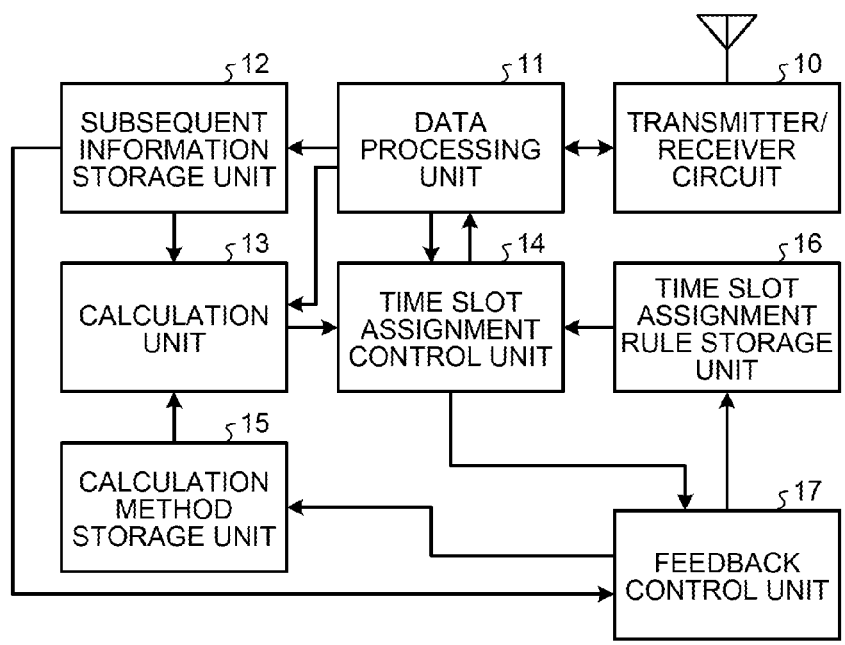
FIG. 9 is a block diagram of a base station device according to a second embodiment.

FIG. 9 is a block diagram of a base station device according to the second embodiment. A radio communication system according to the present embodiment is different from that of the first embodiment from the viewpoint of updating various parameters for determining the assignment of a time slot. In the present embodiment, the radio communication system updates the values of N, M1, and M2, the size of assignment of a time slot, or the like in association with the data generation situation of each of the terminal devices 2 and the change of a transmission and reception environment of data between the base station device 1 and the terminal device 2. Therefore, hereinafter, updating of the values of N, M1, and M2 or the size of assignment of a time slot will be mainly explained. As illustrated in FIG. 9, the base station device 1 according to the present embodiment further includes a feedback control unit 17 in addition to the base station device explained in the first embodiment. In FIG. 9, the components having the same reference numbers as those of FIG. 1 have the same functions unless they are particularly explained.

The feedback control unit 17 acquires, from the subsequent information storage unit 12, information of the presence or absence of Moredata in subsequent state notification packets previously transmitted from each of the terminal devices 2. Moreover, the feedback control unit 17 acquires time slot assignment information to each of the terminal devices 2 from the time slot assignment control unit 14.

The feedback control unit 17 according to the present embodiment stores an allowable threshold when the number of packets to which Moredata is added among the latest N subsequent state notification packets is continuously changed. For example, the feedback control unit 17 extracts sets of subsequent state notification packets up to the threshold as sequentially become old, like a set of the newest N subsequent state notification packets, a set of N subsequent state notification packets before one, and the like. Then, the feedback control unit 17 calculates the number of packets, to which Moredata is added, in each set. Then, when the calculated number is continuously changed within the range of the threshold, the feedback control unit 17 determines that the assignment of a time slot is excessively changed because the number N of samples of past data is small. Then, the feedback control unit 17 rewrites the value of the parameter N stored in the calculation method storage unit 15 and the time slot assignment rule storage unit 16 into a larger value.

Moreover, the feedback control unit 17 according to the present embodiment determines whether the time slot assignment control unit 14 assigns a certain-size time slot. Then, when the certain size is assigned but the number of packets to which Moredata is added among the latest N subsequent state notification packets is not changed, the feedback control unit 17 increases the size of a time slot to be assigned. For example, when the certain size is set to double of the time slot, it is assumed that the number of packets to which Moredata is added is not changed in spite of doubling the size of the time slot of the specified terminal device 2. At this time, the feedback control unit 17 rewrites a time slot assignment rule stored in the time slot assignment rule storage unit 16 and changes the assignment of the slot to have a quadruple slot.

The parameter changing process performed by the feedback control unit 17 as explained above is an example. If the process is a process for changing a time slot in accordance with a certain request, the process is particularly not limited.

Next, another example of the determination method of the size of each parameter will be explained.

Figure 10:
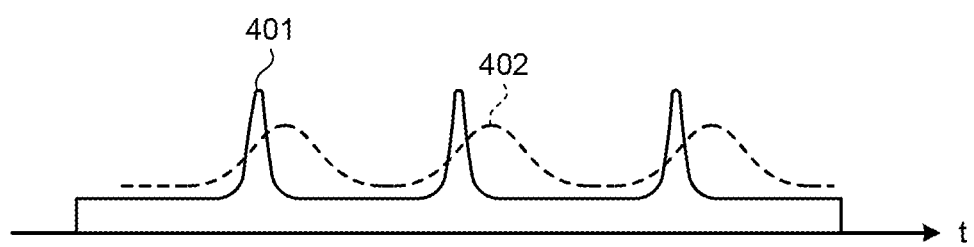
FIG. 10 is a diagram explaining subsequent state notification packets to which Moredata is added and the assigned size of a time slot in the system in which the generation of data or the degradation of a channel occurs suddenly.

FIG. 10 is a diagram explaining subsequent state notification packets to which Moredata is added and the assigned size of a time slot in the system in which the generation of data or the degradation of a channel occurs suddenly.

When the generation of data or the degradation of a channel occurs suddenly, the number of subsequent state notification packets to which Moredata is added suddenly increases like a solid line 401 of FIG. 10. As a result, the base station device 1 assigns a larger time slot to the terminal device 2, and thus the assigned size of the time slot is changed like a dotted line 402. However, the assignment of the time slot as in FIG. 10 may cause large data delay because peak times of the solid line 401 and the dotted line 402 depart from each other. Therefore, in case of the system in which the generation of data or the degradation of a channel occurs suddenly as illustrated in FIG. 10, the feedback control unit 17 reduces the value of N. As a result, because a reaction speed of assignment of the time slot rises, the peak of the solid line 401 can approach the peak of the dotted line 402 and thus the assignment of a more appropriate time slot can be performed. Herein, the feedback control unit 17 determines whether the packets increase suddenly with reference to the number of the past subsequent state notification packets to which Moredata is added and thus can determine whether the generation of data or the degradation of a channel occurs suddenly in the system.

Figure 11:
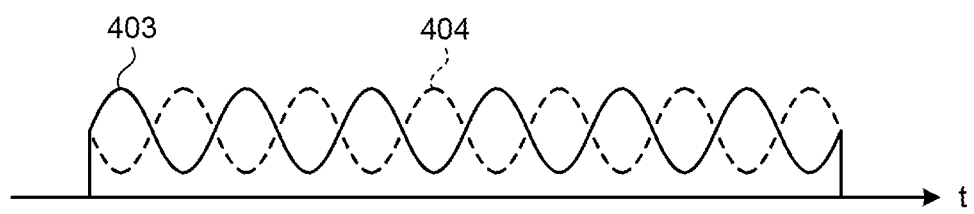
FIG. 11 is a diagram explaining subsequent state notification packets to which Moredata is added and the assigned size of a time slot in the system in which the generation of data or the degradation of a channel occurs in an intensely fluctuating manner.

FIG. 11 is a diagram explaining subsequent state notification packets to which Moredata is added and the assigned size of a time slot in the system in which the generation of data or the degradation of a channel occurs in an intensely fluctuating manner.

When the generation of data or the degradation of a channel occurs in an intensely fluctuating manner, subsequent state communication packets to which Moredata is added are generated in an intensely fluctuating manner as illustrated by a solid line 403 of FIG. 11. Therefore, time slot assignment to the terminal device 2 by the base station device 1 intensely fluctuates as illustrated by a dotted line 404. In this regard, because transmission and reception of a packet are performed to change the assignment of a time slot, a time and energy applied to the packet transmission and reception are consumed. Therefore, it is preferable to suppress frequency of change of time slot assignment. However, the parameter setting method in FIG. 11 executes the change of time slot assignment very frequently. Therefore, in case of the system in which the generation of data or the degradation of a channel occurs in an intensely fluctuating manner as illustrated in FIG. 11, the feedback control unit 17 increases the value of N. As a result, the frequency of the change of time slot assignment can be reduced.

As described above, the radio communication system according to the present embodiment has the configuration that the change of time slot assignment is performed in accordance with various parameters for calculating time slot assignment, a communication environment, and the like. More specifically, the radio communication system according to the present embodiment changes the calculation method and the time slot assignment rule to more optimal contents in accordance with a communication environment and the like. As a result, even when a data generation situation in the terminal device or a transmission and reception environment between the base station device and the terminal device is easily changed, an appropriate time slot can be assigned and thus data delay and power consumption can be reduced.

[c] Third Embodiment

A radio communication system according to the third embodiment is different from that of the first embodiment in that a base station device waits a time slot assignment process up to the reception of a data packet at a specified time and ignores other data when receiving the other data.

Herein, performing a process only when receiving specified data has the following meaning. For example, only when receiving data whose assigned time slot is totally used, the base station device 1 starts the process. Alternatively, only when receiving the next data of data whose subsequent state notification packet is Moredata, the base station device 1 starts the process. Alternatively, only when receiving data that is transmitted in a time slot assigned by a Polling packet, the base station device 1 starts the process.

The base station device 1 according to the third embodiment is also illustrated by the block diagram illustrated in FIG. 2. In the radio communication system according to the third embodiment, components having the same reference numbers as those of the first embodiment have the same functions unless they are particularly explained.

Figure 12:
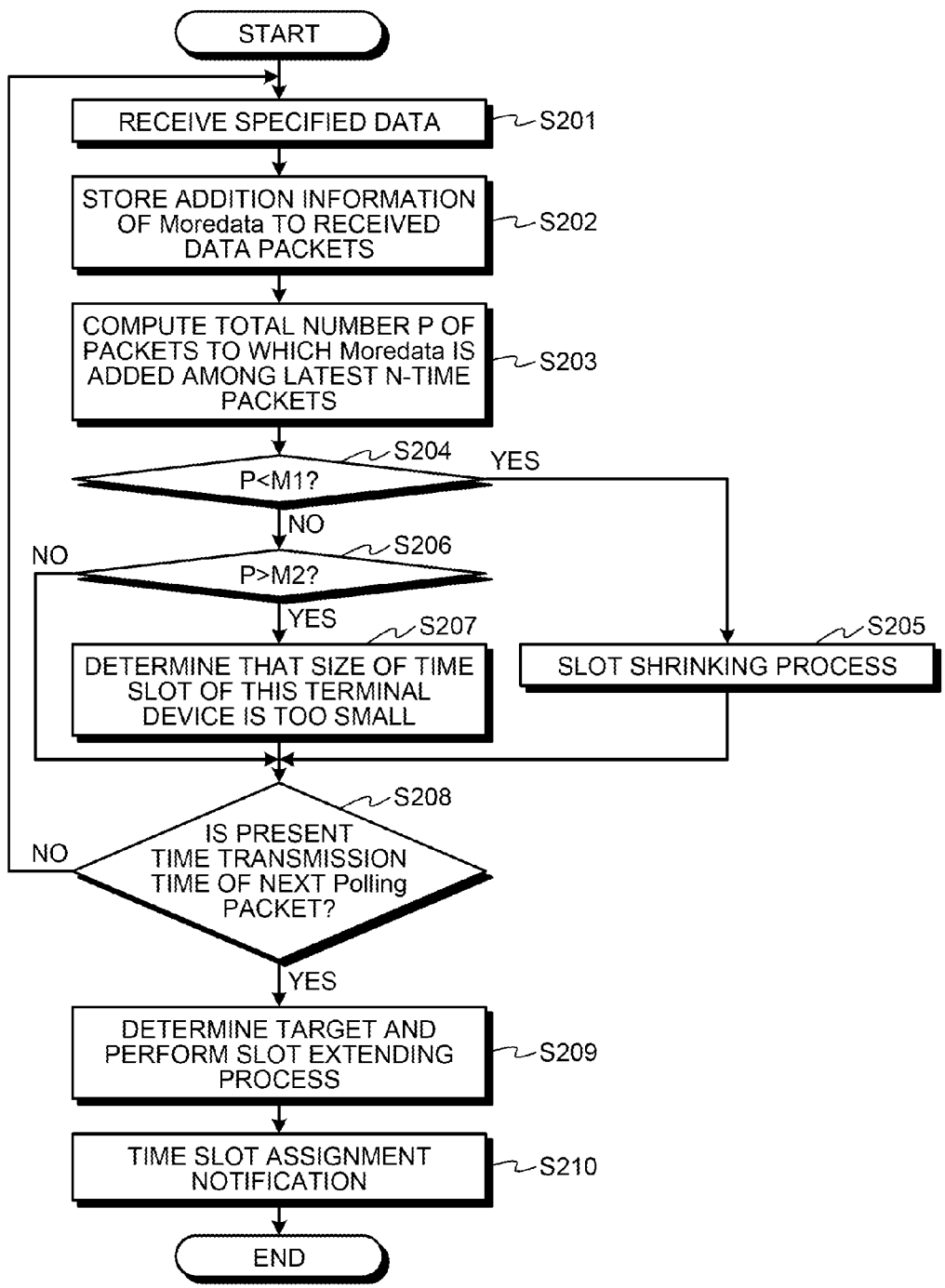
FIG. 12 is a flowchart illustrating a time slot assignment process performed by a radio communication system according to a third embodiment.

Next, a time slot assignment process performed by the radio communication system according to the present embodiment will be explained with reference to FIG. 12. FIG. 12 is a flowchart of a time slot assignment process performed by the radio communication system according to the third embodiment.

The data processing unit 11 receives a timing packet included in specified data from the terminal device 2 via the antenna and the transmitter/receiver circuit 10 (Step S201).

The data processing unit 11 determines whether Moredata is added to the received subsequent state notification packet, and makes the subsequent information storage unit 12 store the determination result and the identification information and reception time of the terminal device 2 that transmits the data packets (Step S202). Then, the data processing unit 11 notifies the calculation unit 13 of the reception of the data packets and the identification information of the terminal device 2 that transmits the data packets.

The calculation unit 13 receives the reception information of the subsequent state notification packet, and computes the total number P of packets to which Moredata is added among the latest N-time packets transmitted by the terminal device 2 that transmits the data packets (Step S203). The calculation unit 13 transmits, to the time slot assignment control unit 14, the total number P of packets to which Moredata is added among the latest N-time packets transmitted by the terminal device 2 that transmits the data packets.

The time slot assignment control unit 14 determines whether P is smaller than the certain threshold M1 (Step S204). In case of P<M1 (Step S204: YES), the time slot assignment control unit 14 performs the slot shrinking process on the slot assigned to the terminal device 2 that transmits the data packets (Step S205). Then, the process moves to Step S208. On the contrary, in case of P1≥M41 (Step S204: NO), the time slot assignment control unit 14 determines whether P is larger than the certain threshold M2 (Step S206). In case of P>M2 (Step S206: YES), the time slot assignment control unit 14 determines that the size of the time slot of the terminal device 2 that transmits data packets is too small (Step S207).

On the contrary, in case of P1≤M2 (Step S206: NO), the time slot assignment control unit 14 does not change the assignment of the time slot of the terminal device 2 that transmits data packets, and moves the process to Step S208.

The time slot assignment control unit 14 determines whether the present time is the transmission time of the next Polling packet (Step S208). When the present time is not the transmission time of the next Polling packet (Step S208: NO), the process moves to Step S201.

On the contrary, when the present time is the transmission time of the next Polling packet (Step S208: YES), the time slot assignment control unit 14 extracts the terminal device 2 having the largest Moredata ratio among the terminal devices 2 for which it is determined that the size of the time slot is too small. Then, the time slot assignment control unit 14 determines the extracted terminal device 2 as a target for the slot extending process and performs the slot extending process on the extracted terminal device 2 (Step S209).

Then, the data processing unit 11 notifies the terminal device 2 of information on the time slot assigned by the time slot assignment control unit 14 to the terminal device 2 that transmits data packets (Step S210).

In the first embodiment, it has been explained that the time slot assignment process is waited up to the reception of data packets at a specified time and other data are ignored when the other data are received. However, this technique can be used in the second embodiment.

[d] Fourth Embodiment

A radio communication system according to the fourth embodiment is different from that of the first embodiment in that a process is performed every time a super frame is terminated. Herein, the super frame is a certain fixed time or is a time interval until certain constant packets are received. Hereinafter, the base station device 1 according to the fourth embodiment is illustrated by the block diagram illustrated in FIG. 2. In the radio communication system according to the fourth embodiment, components having the same reference numbers as those of the first embodiment have the same functions unless they are particularly explained.

Figure 13:
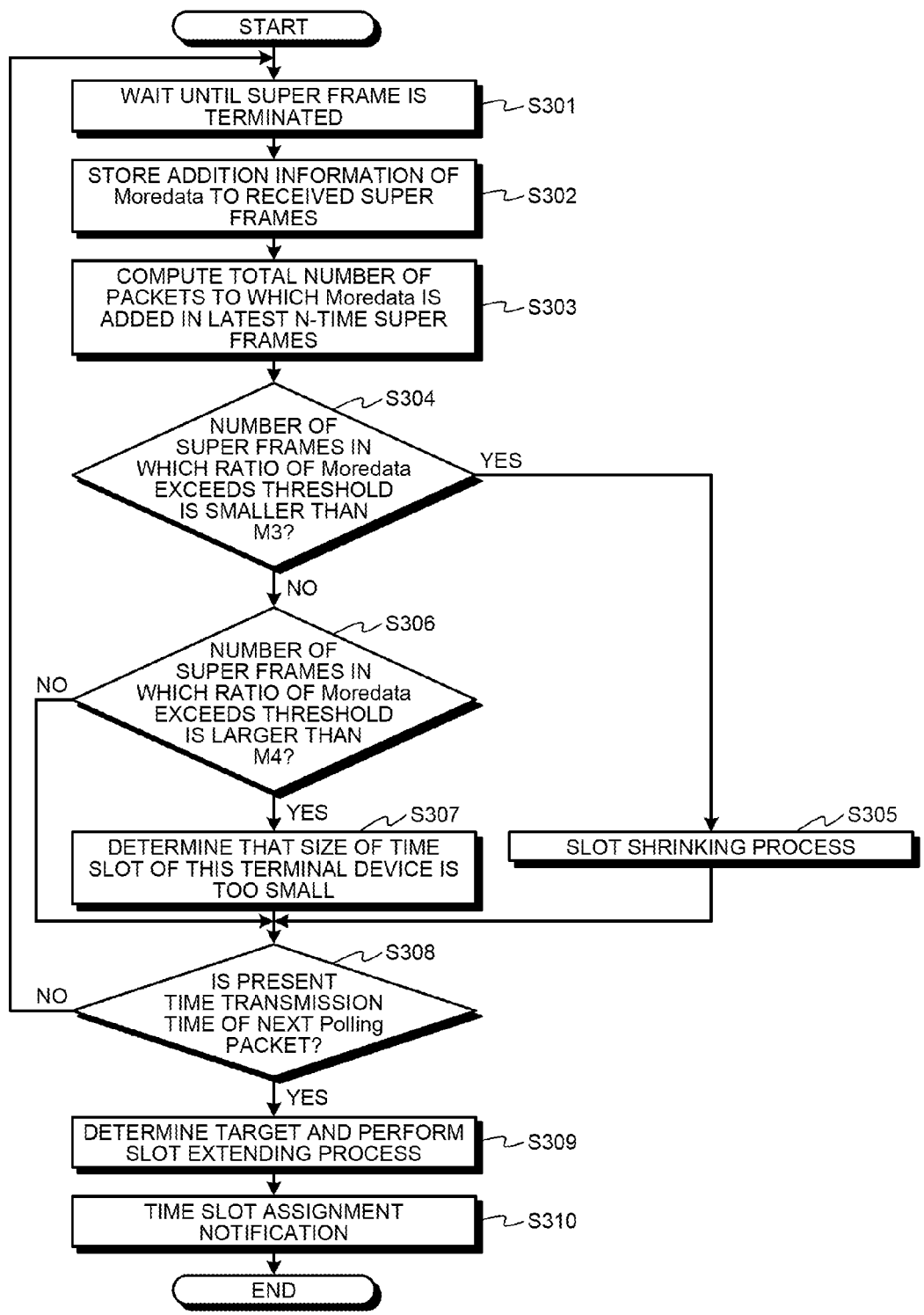
FIG. 13 is a flowchart illustrating a time slot assignment process performed by a radio communication system according to a fourth embodiment.

A time slot assignment process performed by the radio communication system according to the present embodiment will be explained with reference to FIG. 13. FIG. 13 is a flowchart of a time slot assignment process performed by the radio communication system according to the fourth embodiment.

The data processing unit 11 waits until a super frame is terminated while receiving data packets from the terminal device 2 via the antenna and the transmitter/receiver circuit 10 (Step S301).

The data processing unit 11 determines whether Moredata is added to each subsequent state notification packet included in the received super frame. Then, the data processing unit 11 makes the subsequent information storage unit 12 store the determination result and the identification information and reception time of the terminal device 2 that transmits the data packets (Step S302). Then, the data processing unit 11 notifies the calculation unit 13 of the reception of the data packets and the identification information of the terminal device 2 that transmits the data packets.

The calculation unit 13 receives the reception information of the subsequent state notification packets, and computes the total number of packets to which Moredata is added within the latest N-time super frames of the terminal device 2 that transmits the data packets (Step S303). The calculation unit 13 transmits, to the time slot assignment control unit 14, the total number of packets to which Moredata is added within the latest N-time super frames of the terminal device 2 that transmits the data packets.

The time slot assignment control unit 14 calculates the number of super frames for which the total number of packets to which Moredata is added exceeds a certain threshold. Then, the time slot assignment control unit 14 determines whether the number of super frames for which the total number of packets to which Moredata is added exceeds the threshold is smaller than a threshold M3 (Step S304). Herein, the value of M3 and the threshold for the total number of packets to which Moredata is added are defined in the time slot assignment rule.

When the number of super frames is smaller than the threshold M3 (Step S304: YES), the time slot assignment control unit 14 performs the slot shrinking process on the slot assigned to the terminal device 2 that transmits data packets (Step S305). Then, the process moves to Step S308.

When the number of super frames is not less than the threshold M3 (Step S304: NO), the time slot assignment control unit 14 determines whether the number of super frames for which the total number of packets to which Moredata is added exceeds the threshold is larger than a threshold M4 (Step S306). When the number of super frames is larger than the threshold M4 (Step S306: YES), the time slot assignment control unit 14 determines that the size of the time slot of the terminal device 2 that transmits data packets is too small (Step S307).

On the contrary, when the number of super frames is smaller than the threshold M4 (Step S306: NO), the time slot assignment control unit 14 does not change the assignment of the time slot of the terminal device 2 that transmits data packets, and moves the process to Step S308.

The time slot assignment control unit 14 determines whether the present time is the transmission time of the next Polling packet (Step S308). When the present time is not the transmission time of the next Polling packet (Step S308: NO), the process moves to Step S301.

On the contrary, when the present time is the transmission time of the next Polling packet (Step S308: YES), the time slot assignment control unit 14 extracts the terminal device 2 having the largest Moredata ratio among the terminal devices 2 for which it is determined that the size of the time slot is too small. Then, the time slot assignment control unit 14 determines the extracted terminal device 2 as a target for the slot extending process and performs the slot extending process on the extracted terminal device 2 (Step S309).

Then, the data processing unit 11 notifies the terminal device 2 of information on the time slot assigned by the time slot assignment control unit 14 to the terminal device 2 that transmits data packets (Step S310).

In the present embodiment, it has been explained that whether the total number of Moredata in a super frame exceeds a threshold is determined. A method for determining whether the total number of Moredata in a super frame is less than a threshold may be employed. Moreover, the determination may be performed by using a ratio of Moredata in a super frame as a standard.

Moreover, in the present embodiment, it has been explained that the process is performed every time the super frame is terminated. The technique can be used in the second or third embodiment.

[e] Fifth Embodiment

A radio communication system according to the fifth embodiment is different from that of the first embodiment in that the assignment of a time slot is performed by using a change amount of a ratio of Moredata in addition to the ratio of Moredata. Moreover, the base station device 1 according to the fifth embodiment is also illustrated by the block diagram illustrated in FIG. 2. In the radio communication system according to the fifth embodiment, components having the same reference numbers as those of the first embodiment have the same functions unless they are particularly explained.

A time slot assignment process performed by the radio communication system according to the present embodiment will be explained with reference to FIG. 14. FIG. 14 is a flowchart of a time slot assignment process performed by the radio communication system according to the fifth embodiment.

The data processing unit 11 receives data packets from the terminal device 2 via the antenna and the transmitter/receiver circuit 10 (Step S401).

The data processing unit 11 determines whether Moredata is added to the received subsequent state notification packet, and makes the subsequent information storage unit 12 store the determination result and the identification information and reception time of the terminal device 2 that transmits the data packets (Step S402). Then, the data processing unit 11 notifies the calculation unit 13 of the reception of the data packets and the identification information of the terminal device 2 that transmits the data packets.

The calculation unit 13 receives reception information of the subsequent state notification packet, and computes the total number P of packets to which Moredata is added among the latest N-time packets transmitted by the terminal device 2 that transmits the data packets (Step S403). The calculation unit 13 transmits, to the time slot assignment control unit 14, a ratio of packets, to which Moredata is added, to the latest N-time packets transmitted by the terminal device 2 that transmits the data packets.

The time slot assignment control unit 14 stores a ratio of packets, to which Moredata is added, to the latest N-time packets transmitted from the calculation unit 13. Herein, the time slot assignment control unit 14 stores ratios from the present ratio to the ratio before N times. Then, the time slot assignment control unit 14 determines whether a change amount between the ratio of the present Moredata and the ratio of Moredata before N times is less than $-\alpha$ (Step S404). When the change amount is less than $-\alpha$ (Step S404: YES), the time slot assignment control unit 14 performs the slot shrinking process on the slot assigned to the terminal device 2 that transmits data packets (Step S405). Then, the process moves to Step S408.

On the contrary, when the change amount is not less than $-\alpha$ (Step S404: NO), the time slot assignment control unit 14 determines whether the change amount is larger than $\alpha$ (Step S406). When the change amount is larger than $\alpha$ (Step S406: YES), the time slot assignment control unit 14 determines that the size of the time slot of the terminal device 2 that transmits data packets is too small (Step S407).

On the contrary, when the change amount is not more than $\alpha$ (Step S406: NO), the time slot assignment control unit 14 does not change the assignment of the time slot of the terminal device 2 that transmits data packets, and moves the process to Step S408.

The time slot assignment control unit 14 determines whether the present time is the transmission time of the next Polling packet (Step S408). When the present time is not the transmission time of the next Polling packet (Step S408: NO), the process returns to Step S401.

On the contrary, when the present time is the transmission time of the next Polling packet (Step S408: YES), the time slot assignment control unit 14 extracts the terminal device 2 having the largest Moredata ratio among the terminal devices 2 for which it is determined that the size of the time slot is too small. Then, the time slot assignment control unit 14 determines the extracted terminal device 2 as a target for the slot extending process and performs the slot extending process on the extracted terminal device 2 (Step S409).

Then, the data processing unit 11 notifies the terminal device 2 of information on the time slot assigned by the time slot assignment control unit 14 to the terminal device 2 that transmits data packets (Step S410).

As described above, in the second to fifth embodiments, the assignment of a time slot most suitable for each radio communication system can be performed by changing a time of the time slot assignment process or a criterion of the size of a time slot.

As described above, according to an aspect of the embodiments, the processing load and power consumption in the base station device and the terminal device can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
   a calculation unit that computes, based on subsequent information that is added to data from a terminal device and indicates presence or absence of untransmitted data which is reserved in the terminal device and is requested to be transmitted within a specific time when transmitting the data, a number of data in which the untransmitted data exists among a certain number of data previously transmitted from the terminal device;
   a time slot assignment control unit that previously stores a first threshold and a second threshold smaller than the first threshold, calculates a ratio of the data in which the untransmitted data exists in the terminal device based on the number of data, in which the untransmitted data exists, calculated by the calculation unit, extends the time slot to be assigned to the terminal device when the ratio of the data in which the untransmitted data exists exceeds the first threshold that is previously stored, and shrinks the time slot to be assigned to the terminal device when the ratio of the data in which the untransmitted data exists is less than the second threshold;
   a feedback control unit that changes a control parameter of the calculation unit and the time slot assignment control unit based on one or both of the subsequent information added to the data previously transmitted from the terminal device and assignment information of the time slot by the time slot assignment control unit, the control parameter including the certain number of the data previously transmitted from the terminal device; and
   a notifying unit that notifies the terminal device of the assigned size of the time slot determined by the time slot assignment control unit.

2. The base station device according to claim 1, wherein the calculation unit calculates, based on data transmitted from a plurality of terminal devices, a number of data in which the untransmitted data exists among a certain number of data transmitted from the terminal device for each of the terminal devices, and the time slot assignment control unit calculates a ratio of the data in which the untransmitted data exists for each of the terminal devices based on the number of data, in which the untransmitted data exists, calculated by the calculation unit, and when a number of the terminal devices for which the ratio of the data in which the untransmitted data exists exceeds the first threshold is two or more, preferentially performs time slot extension on the terminal device for which the ratio of the data in which the untransmitted data exists is higher.

3. A radio communication system that includes a base station device and a plurality of terminal devices,
   the base station device comprising:
   a calculation unit that computes, based on subsequent information that is added to data from the terminal device and indicates presence or absence of untransmitted data which is reserved in the terminal device and is requested to be transmitted within a specific time, a number of data in which the untransmitted data exists among a certain number of data previously transmitted from the terminal device;
   a time slot assignment control unit that previously stores a first threshold and a second threshold smaller than the first threshold, calculates a ratio of the data in which the untransmitted data exists in the terminal device based on the number of data, in which the untransmitted data exists, calculated by the calculation unit, extends the time slot to be assigned to the terminal device when the ratio of the data in which the untransmitted data exists exceeds the first threshold, and shrinks the time slot to be assigned to the terminal device when the ratio of the data in which the untransmitted data exists is less than the second threshold;
   a feedback control unit that changes a control parameter of the calculation unit and the time slot assignment control unit based on one or both of the subsequent information added to the data previously transmitted from the terminal device and assignment information of the time slot by the time slot assignment control unit, the control parameter including the certain number of data previously transmitted from the terminal device; and
   a notifying unit that notifies the terminal device of the assigned size of the time slot determined by the time slot assignment control unit, and
   each of the terminal devices of the plurality of terminal device comprising:
   a data transmitting unit that transmits data to which the subsequent information is added to the base station device; and
   an assignment information acquiring unit that acquires the assigned size of the time slot from the base station device.

4. A base station device control method comprising:
   acquiring subsequent information that is added to data from a terminal device and indicates presence or absence of untransmitted data which is reserved in the terminal device and is requested to be transmitted within a specific time;
   changing a control parameter based on one or both of the subsequent information added to data previously transmitted from the terminal device and assignment information of a time slot, the control parameter including a certain number of the data previously transmitted from the terminal device;

computing a number of data in which the untransmitted data exists among the certain number of the data previously transmitted from the terminal device;

controlling the assigned size of a time slot to the terminal device based on the number of the data in which the untransmitted data exists;

calculating a ratio of the data in which the untransmitted data exists in the terminal device based on the number of data, in which the untransmitted data exists;

extending the time slot to be assigned to the terminal device when the ratio of the data in which the untransmitted data exists exceeds a first threshold that is previously stored;

shrinking the time slot to be assigned to the terminal device when the ratio of the data in which the untransmitted data exists is less than the second threshold that is previously stored and is smaller than the first threshold; and notifying the terminal device of the assigned size of the time slot.

* * * * *